(12) United States Patent
Chowdhury et al.

(10) Patent No.: US 11,610,207 B1
(45) Date of Patent: Mar. 21, 2023

(54) FINANCIAL-BASED RECOMMENDATION ENGINE

(71) Applicant: Yodlee, Inc., San Mateo, CA (US)

(72) Inventors: Amritap Chowdhury, Kolkata (IN); Atif Adib, Bangalore (IN); Preethy Varma, Bangalore (IN); Priyanka Sawant, Bangalore (IN); Vinay Manjunath, Bangalore (IN)

(73) Assignee: YODLEE, INC., San Mateo, CA (US)

( * ) Notice: Subject to any disclaimer, the term of this patent is extended or adjusted under 35 U.S.C. 154(b) by 0 days.

(21) Appl. No.: 17/522,773

(22) Filed: Nov. 9, 2021

(51) Int. Cl.
*G06Q 20/40* (2012.01)
*G06Q 20/42* (2012.01)

(52) U.S. Cl.
CPC ..... *G06Q 20/4016* (2013.01); *G06Q 20/4014* (2013.01); *G06Q 20/425* (2013.01)

(58) Field of Classification Search
None
See application file for complete search history.

(56) References Cited

U.S. PATENT DOCUMENTS

| | | | |
|---|---|---|---|
| 2016/0055501 A1* | 2/2016 | Mukherjee | G06Q 10/10 705/7.34 |
| 2016/0117772 A1* | 4/2016 | Zhang | G06Q 40/06 705/36 R |
| 2022/0138857 A1* | 5/2022 | Sun | G06Q 30/0201 705/36 R |

FOREIGN PATENT DOCUMENTS

WO    WO-2015048181 A1 *  4/2015  ........... G06F 17/241

OTHER PUBLICATIONS

Tyrrell, D., "Consumers Demand Hyper-Personalization in Their Digital Financial Experiences," Envestnet Yodlee, May 6, 2020, 2 pages, retrieved from https://www.yodlee.com/financial-wellness/consumers-demand-hyper-personalization-their-digital-financial-experiences.

* cited by examiner

*Primary Examiner* — Bruce I Ebersman
*Assistant Examiner* — Matthew Cobb
(74) *Attorney, Agent, or Firm* — Zilka-Kotab, P.C.

(57) ABSTRACT

As described herein, a system, method, and computer program are provided for a financial-based recommendation engine. In use, financial-related data is gathered for a plurality of users from a plurality of sources. Additionally, the plurality of users are clustered into a plurality of cohorts, based on the financial-related data. Further, a plurality of user profiles are created for the plurality of cohorts, including for each cohort of the plurality of cohorts, creating a corresponding user profile based on the financial-related data for the users in the cohort. Still yet, each user profile of the plurality of user profiles is matched to one another and to one or more financial products. Moreover, the one or more financial products matched to each user profile of the plurality of user profiles are recommended to the users in the cohort that corresponds to the user profile.

13 Claims, 5 Drawing Sheets

FINANCIAL-BASED RECOMMENDATION ENGINE

FIELD OF THE INVENTION

The present invention relates to recommendation systems.

BACKGROUND

Recommendation systems, in general, are automated systems (e.g. computer programs, processes, etc.) that generate recommendations for contents, services, etc. Using a variety of digital data points, recommendation systems can be built which are dynamic, generalized to multiple use cases, and personalized to the granularity of not just every individual but for particular situations for a given individual. Such recommendation systems are valuable as they provide actionable recommendations specific for a given situation.

While recommendation systems are commonly used in the online entertainment world, recommendations systems in the financial industry space have been limited or even non-existent. Financial Service Providers (FSPs) have a huge interest in understanding user profiles and recommending the best financial products/action to their users.

There is thus a need for addressing these and/or other issues associated with the prior art.

SUMMARY

As described herein, a system, method, and computer program are provided for a financial-based recommendation engine. In use, financial-related data is gathered for a plurality of users from a plurality of sources. Additionally, the plurality of users are clustered into a plurality of cohorts, based on the financial-related data. Further, a plurality of user profiles are created for the plurality of cohorts, including for each cohort of the plurality of cohorts, creating a corresponding user profile based on the financial-related data for the users in the cohort. These user profiles may be assigned a temporal dimension which enables tracking the progression of a particular user (or a set of users) from one cohort to the other. This in turn helps estimate the typical temporal progression paths of users. Still yet, each user profile of the plurality of user profiles is matched to one another and to one or more financial products, which may be based on the current cohort the user belongs to as well as the potential next cohort the user will most likely progress into. Moreover, the one or more financial products matched to each user profile of the plurality of user profiles are recommended to the users in the cohort that corresponds to the user profile.

DETAILED DESCRIPTION

Figure 1:
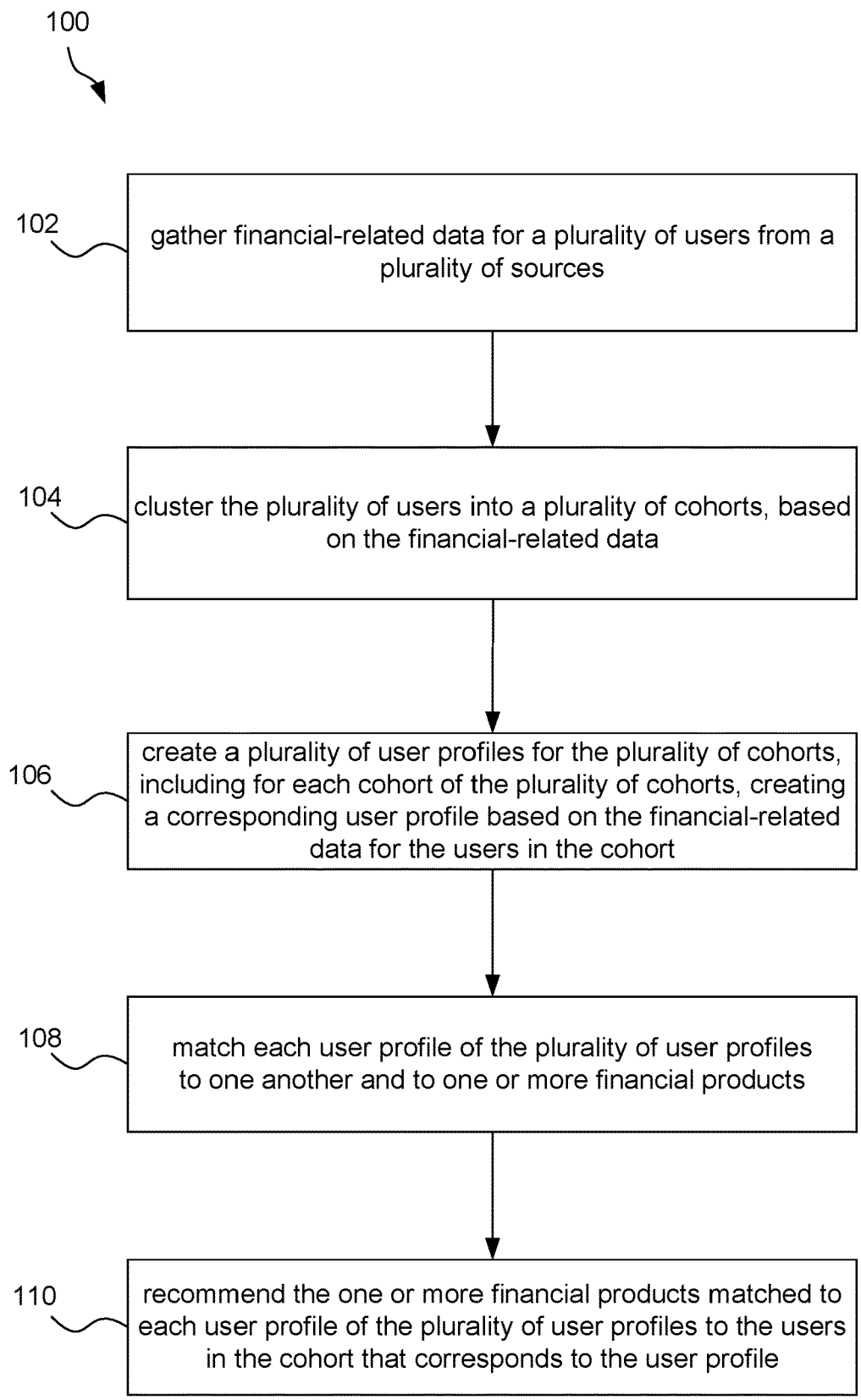
FIG. 1 illustrates a method for making financial-based recommendations, in accordance with one embodiment.

FIG. 1 illustrates a method 100 for making financial-based recommendations, in accordance with one embodiment. The method 100 may be performed by any computer system executing a financial-based recommendation engine, such as those described below with respect to FIGS. 4 and/or 5. For example, the method 100 may be performed by a computer system interfacing a system of one or more financial institutions that generate financial transaction data based on the financial transactions of its users (i.e. consumers), among other data systems. The computer system performing the method 100 may be a sub-system of one of the financial institutions, in one embodiment. The method 100 is performed to generate financial product recommendations to users.

In operation 102, financial-related data is gathered for a plurality of users from a plurality of sources. The financial-related data includes any data related to the finances of the users. For example, the financial-related data may include financial transactions (e.g. credits, debits, transfers, etc.), financial investments, willingness to take financial risk, financial product type preferences, financial goals and the timelines to achieve those goals, financial product performance, macro economic data, and/or financial regulatory information.

The sources of the financial-related data may include systems storing the financial-related data. For example, the sources may include a financial data aggregation platform, a personal financial management platform, a unified managed accounts wealth platform, surveys, online portals, and/or data providers. The financial-related data may be gathered on-demand (e.g. periodically), or may be streamed to the financial-based recommendation engine.

In operation 104, the plurality of users are clustered into a plurality of cohorts, based on the financial-related data. The users may be clustered using any process that groups the users into cohorts (e.g. groups, etc.) in accordance with the financial-related data of the users. In particular, the users may be clustered based on similarities in predefined aspects of the financial-related data (e.g. transaction similarity, demographic similarity, etc.).

In one embodiment, the users may be clustered by determining, from the financial-related data, transaction histories of the plurality of users, generating a knowledge graph representation of the transaction histories of the plurality of users, using the knowledge graph representation to cluster the plurality of users based on similarities in the transaction histories, and using historic financial data of each user along with the knowledge graph representation to identify likely temporal progression of the user across cohorts.

In operation 106, a plurality of user profiles are created for the plurality of cohorts, including for each cohort of the plurality of cohorts, creating a corresponding user profile based on the financial-related data for the users in the cohort. The user profile may be created for a cohort to include common attributes of the financial-related data of the users in cohort. For example, the user profiles may include demographic information, indicator of technology usage level, indicator of income level, home ownership information, financial goals, financial risk appetite, behavior data which is reflective of financial preferences, and/or product ownership information. Thus, the user profile created for a cohort may be a general representation of the users in the cohort. In an embodiment, the temporal evolution of the user's profile is tracked over a period of time (e.g. a few years) to estimate how the profile has evolved and what are the most typical evolution paths across multiple users (for example, one such evolution path could be that people who own a house, on an average, were renters for 6.5 years). These typical evolution paths can then used to form a knowledge-graph based connection across the cohorts for progression (e.g. a renter-cohort is likely to progress into a home-owner-cohort and not the other way around).

In operation 108, each user profile of the plurality of user profiles is matched to one another and to one or more financial products, for example based on the current cohort the user belongs to as well as the potential next cohort the user will most likely progress into. The financial products refer to any financial-related products capable of being offered to, and accepted by, users. The financial products may be provided by financial institutions. In various examples, the financial products may include investments, financial accounts, lines of credit, loans, insurance, etc.

As an option, financial product profiles may be defined which each represent a corresponding (e.g. available) financial product. Each financial product profile may indicate attributes of user profiles that are relevant to the corresponding financial product. It is important to mention that, in an embodiment, the financial product's profile will include components which are purely about the product and nothing to do with the users. For example, components may include average yield rate, minimum lock in period, performance relative to competitor products etc. In one embodiment, at least some of the financial product profiles may each be manually defined, or they can be inferred from the product brochures which are made publicly available for investor educational purposes. In another embodiment, at some of the financial product profiles may each be automatically defined (e.g. according to characteristics of known consumers of the corresponding financial product). With respect to this option, each of the user profiles may be matched to one or more financial product profiles defined for the one or more financial products.

In an embodiment, matching each user profile of the plurality of user profiles to one or more financial products may include selecting one or more representative users from the users in each cohort of the plurality of cohorts, determining at least one financial product used by the one or more representative users in each cohort of the plurality of cohorts, and matching the user profile corresponding to each cohort of the plurality of cohorts to the at least one financial product used by the one or more representative users in the cohort.

As an option, the one or more representative users may be selected from the users in each cohort of the plurality of cohorts by calculating a financial completeness score for each user in the plurality of users, based on the financial-related data corresponding to the user, wherein the financial completeness score for the user indicates a degree to which a plurality of transaction segments are represented in the financial-related data corresponding to the user, and further for each of the cohorts, selecting the one or more representative users from the users in the cohort, based on the financial completeness score for each of the users in the cohort.

In one example, the degree to which the plurality of transaction segments are represented in the financial-related data corresponding to the user may be determined by measuring a transaction activity level of the user in each of the plurality of transaction segments. In this case, the financial completeness score for the user may optionally be calculated as a weighted sum of the measured transaction activity levels of the user in the plurality of transaction segments.

As another option, the one or more representative users are further selected from the users in each cohort of the plurality of cohorts by generating an explanation model using granular transaction categorization, using the explanation model to cluster the plurality of users into a plurality of explainable user clusters, and selecting, as the one or more representative users, one or more users overlapping the cohort and an explainable user cluster of the plurality of explainable user clusters, based on the financial completeness score for each of the users in the cohort.

In operation 110, the one or more financial products matched to each user profile of the plurality of user profiles are recommended to the users in the cohort that corresponds to the user profile. The recommendations may be made by sending the recommendations to devices (e.g. mobile devices) of the users, such as by electronic mail, automated call, etc.

As an option, the recommendation may include an explanation for the recommendation of each of the one or more financial products. The explanation may be determined using the particular explainable user cluster that includes the particular representative user that was determined as having used the financial product.

As a further option (not shown), any of the users may be transitioned from a first cohort of the plurality of cohorts to a second cohort of the plurality of cohorts, and thus from a first user profile to a second user profile, based on additional financial-related data gathered for the user corresponding to a duration of time. The transition may optionally only occur when a confidence level calculated for a combination of the user and the second cohort reaches a predefined threshold. The second user profile may then be matched to one or more other financial products which may then be recommended to the user.

In this way, the method 100 may be performed to gather financial-related data from various sources and then draw inferences to make dynamic and personalized financial product recommendations.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
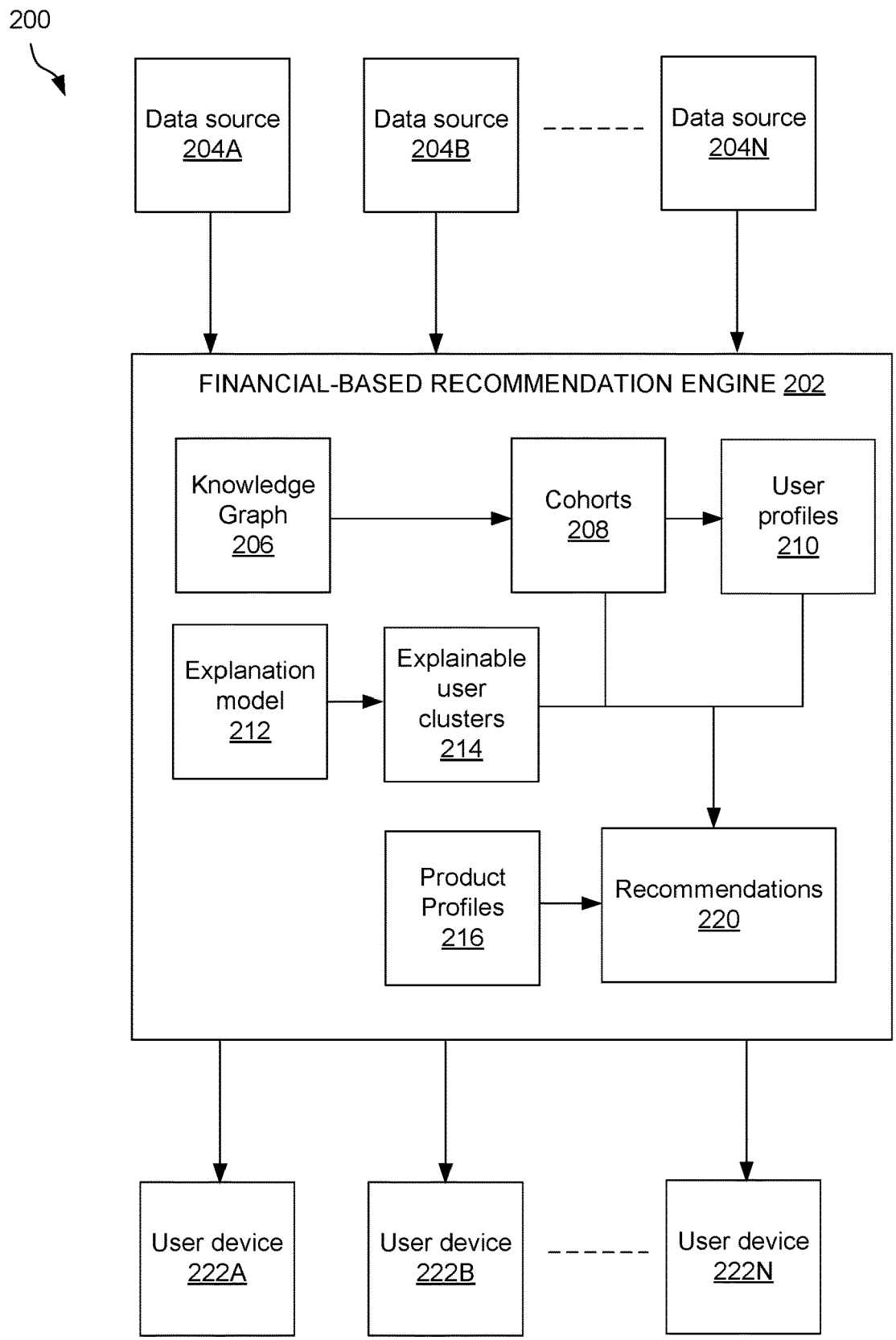
FIG. 2 illustrates a system having a financial-based recommendation engine, in accordance with one embodiment.

FIG. 2 illustrates a system 200 having a financial-based recommendation engine, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a financial-based recommendation engine 202 that gathers financial-related data from a plurality of data sources 204A-N. The financial-related data may include any of the data listed in Table 1.

Table 1

User retail banking data: The data related to the user's financial transactions is available through a financial data aggregation platform.

Investment data: The data related to the user's investments is available through a unified managed accounts wealth platform.

User risk appetite: The user's financial risk appetite can either be inferred based on the patterns in user's historic investments and/or solicited through surveys and questionaries.

User financial goals data: Either through direct questionaries or through the user's financial planning steps or based on the 'peers' of the users, infer the financial goals of the user.

User preference data: As the user interacts with online portals, capture the user's preferences for particular kinds of financial products.

Macro level data: The data related to various financial products currently available, their historic performance, their projected performance in short term and long term, and current terms and conditions, is available through a variety of data providers.

Economic data: The data related to the prevailing economic condition of the regions of interest at various granularities: country to county.

Regulatory data: The data related to the current regulatory environment and how it impacts various aspects of the user's financial profile is available through a variety of data providers.

Using the financial-related data, the engine 202 creates user profiles 210 for cohorts 208 generated using a knowledge graph 206. For example, to create user profiles 210 from financial transaction data in the financial-related data, derived attributes may be leveraged such as merchant (where the transaction happened) and category of the transaction along with user specific attributes (e.g. user geographic details, age, gender, income class, etc.). Users which frequently transact with similar merchants/categories may be clustered into a same cohort. Just by way of example, users who frequent at fast-food restaurants will be in one user profile. This can be made more specific by adding further sequences such as users who frequently visit a fast-food restaurant after a visit to a coffee place will be in a different profile category versus users who frequently visit a coffee place after a visit to a gym will be in a different profile category and so on.

The engine 202 obtains the cohorts using state-of-the-art entity embeddings derived from a knowledge graph representation 206 of the users' transaction histories. A secondary explanation model 212 may also be generated using granular transaction categorization to provide explanations behind any given recommendations, as users tend to trust recommendations that are backed with valid explanations. A modification of the Latent Dirichlet Allocation technique may be used to form explainable clusters of users 214. Overlapping users may be selected based on a user completeness score (described below). The overlapping granularity between the current user of interest and the top users may be used as an explanation for the recommendation.

Table 2 illustrates examples of user profiles that may be created by the engine 202.

Table 2

1. Tech Savvy Urban Families: Urban area, have kids, have pets, above average tech usage, medium to high income, salaried
2. Happy Rural Homes: rural area, have kids, have pets, below average tech usage, medium to high income, salaried
3. Well-off suburbanites: suburbs, have kids, above average tech use, high income, home owners, car owners With regard to the user completeness score (also referred to as a financial completeness score), a holistic view of a user's transactions can be used to identify how much is known about the user, such as how complete the user's representation is in the engine's 202 ecosystem. A user's transaction history may be used to derive a score that will be represent the completeness of the user's information. The geo-details of the user along with the macro economic data may be used to decide what is a valid range of annual income to categorize a user into 'high', 'mid' or 'low'. The proposed score may be used to select representative overlapping users between the knowledge-graph-based user cohort 208 and the explainable user cluster 214. The popular products used by these representative users may be used as recommendations for test users mapped to the cohort during runtime.

To track completeness, the scoring algorithm may measure a user's activity level in different transaction segments such as: Salary credit/Utilities or subscriptions payments Grocery purchase/Insurance payments or claims/Mortgage payments/Rent payments/Credit card payments/Tax payments/Spends in leisure like dining or travel/short term investments vs long term investments/regularity in income and expenditure.

Separate features may be designed to categorize the activity level in each segment as high, moderate and low. A weighted sum of the satisfied features may be used to compute the final completeness score for a user.

As also shown, product profiles 216 are formed for various financial products. Once the user profiles are created, the financial products which fit the needs of the user profile can be identified/inferred. These products can be one time sale products (like a personal loan) or a financial strategy (like a goal-oriented investment strategy). For example, (a) education saving plan is for an account holder who has kids, (b) tax savings are most important for retirement plans, (c) credit line transfer is for accounts that have high liabilities, (d) investment/saving plans for users who recently started working, (e) tax loss harvesting plans for users who have a complex investment plan and need to balance their savings/investment portfolio.

Matching user profiles 210 to relevant product profiles 216 is the essence of a good recommendation engine 202. These recommendations could be generated using multiple methods, including a knowledge-based method or a data driven method or a combination of the two. In the knowledge-based method, business experts create financial product profiles (or even 'seed' portfolios) relevant to each user group. For example, a user who fits a new parent profile is matched with a bunch of product profiles including investment plans on education, insurances etc. that have been carefully curated by the business experts.

In the data driven method, major financial (retail as well as wealth) products consumed by the users in each of the user profile groups may be used to form product profiles which can be recommended to other users in the same profile who are not utilizing these ones but will find them to be beneficial or will need them in the near future. For example, one recommendation of the engine 202 is: most parents who are staying at a particular locality might utilize a systematic investment plan at a local credit union. A new parent (or likely to be a parent) is recommended such an investment plan.

A combination of the knowledge-based method and the data driven method may be used when profile progressions or transitions happen (described in more detail below). For example, when a person transitions user profiles, such as from being "investment banker at an urban area" to a "retired empty nester at a country side", the financial products suggested may be a combination of the knowledge from the experts as well as looking at the products being used by the users in the similar profiles.

In any case, the financial products represented by the matched product profiles 216 are recommended to the users via their user devices 222A-N. Once the engine 202 makes the actual recommendations, the engine 202 may capture whether the user has accepted these recommendations. The user feedback may be in the form of clicks and may be used to evaluate performance of the recommendation engine 202. For example, recommendations given to advisors for products can be evaluated based on client portfolio performance. This user feedback can then be used to make more precise recommendations through A/B testing and/or by updating weights given to user attributes. Complementing these automated ways, there could be user surveys and periodic sessions to evaluate the relevance of these recommendations.

As noted above, user mobility from one cohort and corresponding user profile to another may be supported by the engine 202. As time progresses, there will be changes in the users' lives which will get reflected through their financial data. People shift jobs, their family situations change or they move their homes to different locations. The engine 202 can detect these profile transitions through aggregate analysis of the transaction level data. These changes could act as the events which trigger the switch in the user profile as well. Some of these triggers could act on the confidence of the system in matching a profile to a user. For example, at time $T_x$, a user might have regular travel expenses in a public transport, frequent expenses at environment friendly organizations and has a regular receipt of student scholarship—all these signals give enough confidence to the system to call him/her as a "Eco Conscious Student" profile. Perhaps, at time $T_{x+n\ months}$, the same user might be receiving regular pay checks, a considerable expense on digital/connectivity systems and utilities and might be travelling very often to nature parks or remote sites, all of which get reflected in the data and the system will call him/her as a "Digital Nomad". The engine 202 thus captures these event triggers and assign new profile status as the confidence in these profile switch reaches the required threshold. Hence the engine 202 captures the inherent dynamic nature of profile switching through the enriched financial signals.

To this end, the recommendation engine 202 makes recommendations by accounting for numerous data dimensions mentioned above. As described, the engine 202 is configured to pull data from multiple different sources, infer the relevant details, parameterize the data for consistent usage, create holistic models, make just-in-time recommendations and further learn from the user's interactions.

Figure 3:
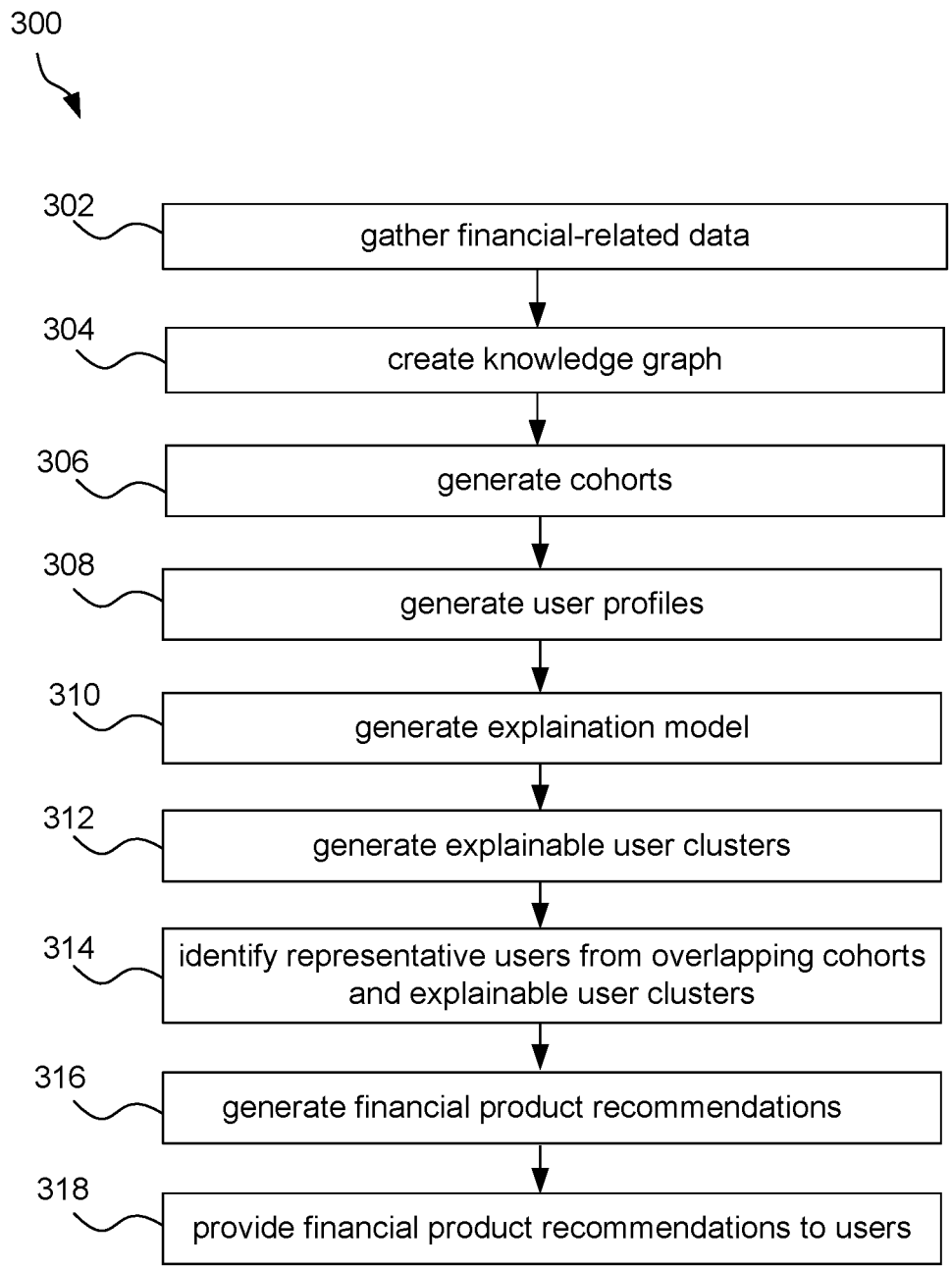
FIG. 3 illustrates a method of the financial-based recommendation engine of FIG. 2, in accordance with one embodiment.

FIG. 3 illustrates a method 300 of the financial-based recommendation engine of FIG. 2, in accordance with one embodiment. Of course, however, the method 300 may be carried out in the context of any desired environment. Further, the aforementioned definitions may equally apply to the description below.

In operation 302, financial-related data is gathered (i.e. for users). In operation 304, a knowledge graph is created, namely from the users' financial transactions indicated in the financial-related data. In operation 306, cohorts of users are generated, in particular using the knowledge graph.

In operation 308, user profiles are generated for the cohorts. In operation 310, an explanation model is created. In operation 312, explainable user clusters are created, in particular using the explanation model. In operation 314, representative users are identified from overlapping cohorts and explainable user clusters.

In operation 316, financial product recommendations are generated. The financial product recommendations may be generated based on financial product profiles matched to the user profiles and/or based on actual financial products used by the representative users. In operation 318, the financial product recommendations are provided to the users.

Figure 4:
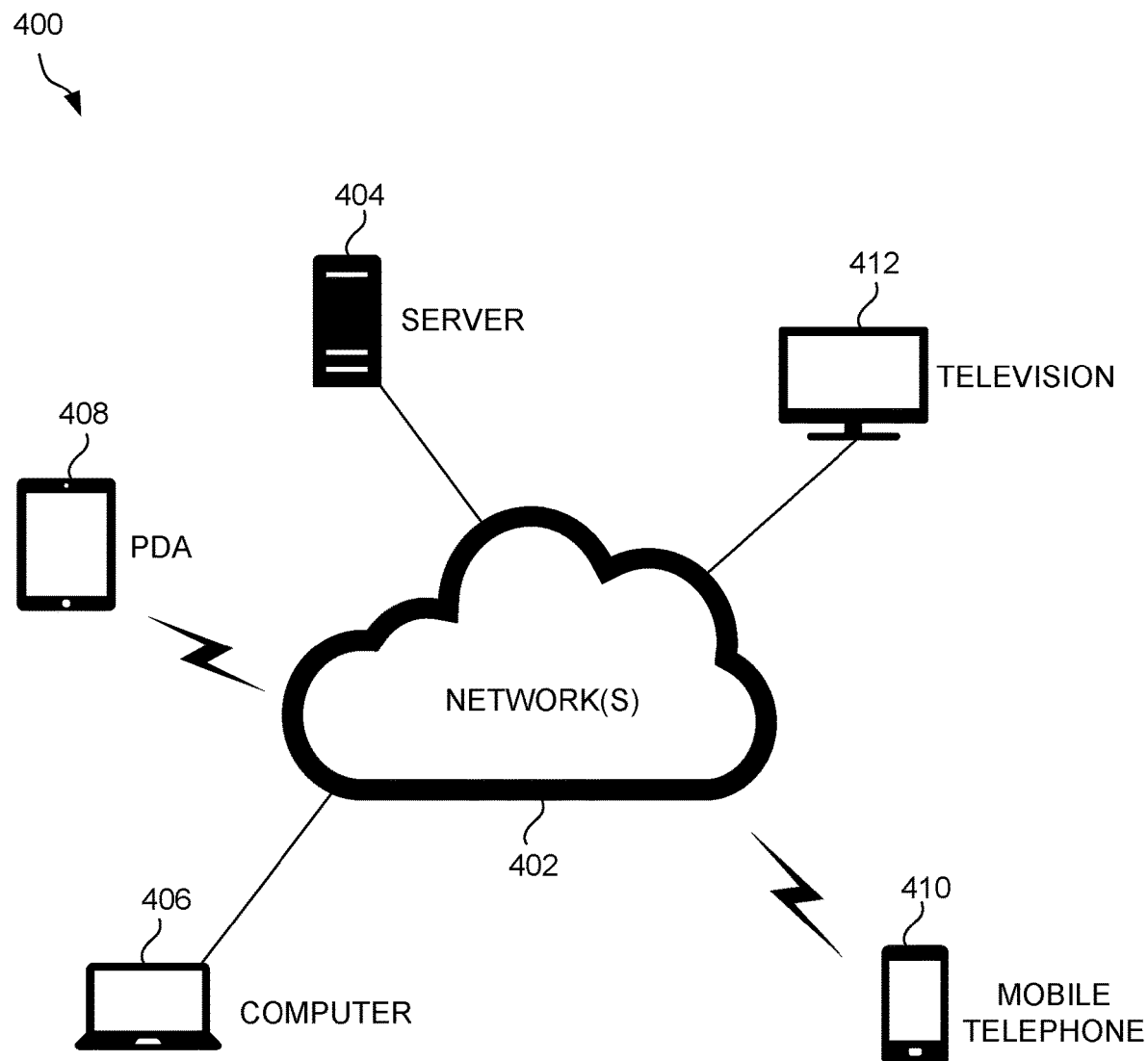
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
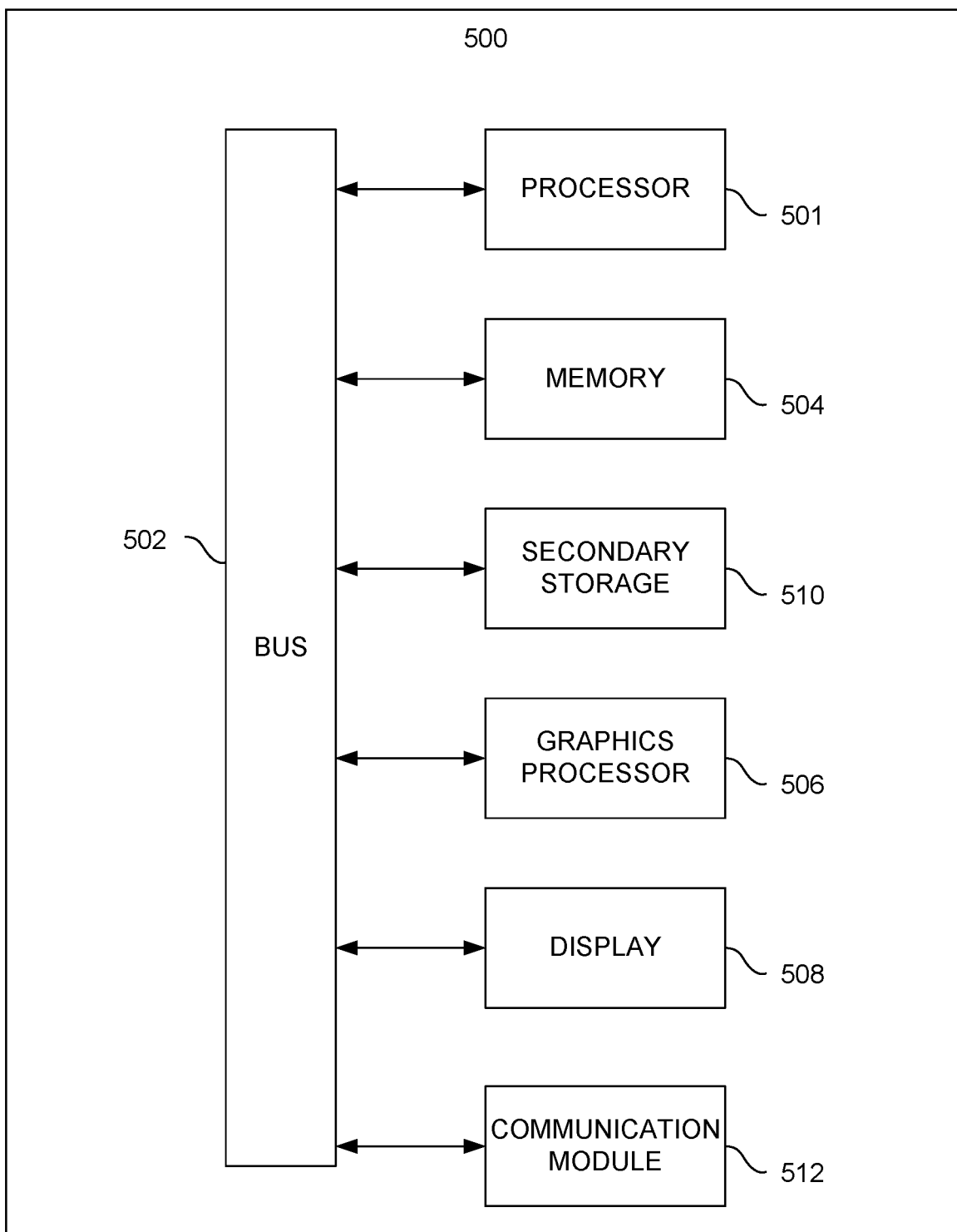
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 4 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512.

The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
    gather financial-related data for a plurality of users from a plurality of sources, the financial-related data including financial transactions of the plurality of users;
    calculate a financial completeness score for each user of the plurality of users, based on the financial-related data corresponding to the user, wherein the financial completeness score for the user indicates a degree to which a plurality of transaction segments are represented in the financial transactions of the user;
    generate a knowledge graph from the financial transactions of the plurality of users;
    cluster the plurality of users into a plurality of cohorts, using the knowledge graph;

for each cohort of the plurality of cohorts, create a corresponding user profile based on the financial-related data for a subset of the plurality of users that are in the cohort;

for each cohort of the plurality of cohorts, select a representative user from the subset of the plurality of users that are in the cohort by:

generating an explanation model for the cohort using granular transaction categorization, using the explanation model to cluster the subset of the plurality of users that are in the cohort into a plurality of explainable user clusters, determining a second subset of users that are included in both the subset of the plurality of users and one of the explainable user clusters, selecting, as the representative user for the cohort, a user from the second subset of users, based on the financial completeness score for the user;

provide financial product recommendations to the plurality of users, including for each cohort of the plurality of cohorts:

determining a financial product that is used by the representative user for the cohort and that matches the user profile created for the cohort, sending a recommendation for the financial product to devices of the users included in the subset of the plurality of users that are in the cohort, wherein the recommendation includes an explanation for the recommendation of the financial product, and wherein the explanation is determined using the one of the explainable user clusters in which the representative user is included.

2. The non-transitory computer-readable media of claim 1, wherein the financial-related data further includes one or more of:

financial investments,
willingness to take financial risk,
financial product type preferences,
financial product performance,
macro economic data, or
financial regulatory information.

3. The non-transitory computer-readable media of claim 1, wherein the plurality of sources include one or more of:

a financial data aggregation platform,
a unified managed accounts wealth platform,
surveys,
online portals, or
data providers.

4. The non-transitory computer-readable media of claim 1, wherein the plurality of user profiles include one or more of:

demographic information,
indicator of technology usage level,
indicator of income level,
home ownership information,
financial goals,
financial risk appetite,
behavior data which is reflective of financial preferences, or
product ownership information.

5. The non-transitory computer-readable media of claim 1, wherein the degree to which the plurality of transaction segments are represented in the financial transactions of the user is determined by:

measuring a transaction activity level of the user in each of the plurality of transaction segments.

6. The non-transitory computer-readable media of claim 5, wherein the financial completeness score for the user is calculated as a weighted sum of the measured transaction activity levels of the user in the plurality of transaction segments.

7. The non-transitory computer-readable media of claim 1, wherein a plurality of financial product profiles of a plurality of financial products include manually defined financial product profiles.

8. The non-transitory computer-readable media of claim 1, wherein a plurality of financial product profiles of a plurality of financial products include automatically defined financial product profiles, the financial product profiles being automatically defined according to characteristics of known consumers of financial products represented by the automatically defined financial product profiles.

9. The non-transitory computer-readable media of claim 1, wherein the computer instructions which when executed by the one or more processors of the device further cause the device to:

transition a user of the plurality of users from a first cohort of the plurality of cohorts to a second cohort of the plurality of cohorts, based on additional financial-related data gathered for the user.

10. The non-transitory computer-readable media of claim 9, wherein the transition occurs when a confidence level calculated for a combination of the user and the second cohort reaches a predefined threshold.

11. The non-transitory computer-readable media of claim 10, wherein the computer instructions which when executed by the one or more processors of the device further cause the device to:

determine a second financial product that is used by the representative user for the second cohort and that matches the user profile created for the second cohort, and send a second recommendation for the second financial product to a device of the user, wherein the second recommendation includes an explanation for the second recommendation of the second financial product, and wherein the explanation is determined using the one of the explainable user clusters in which the second representative user is included.

12. A method, comprising:

at a computer system:

gathering financial-related data for a plurality of users from a plurality of sources the financial-related data including financial transactions of the plurality of users;

calculating a financial completeness score for each user of the plurality of users, based on the financial-related data corresponding to the user, wherein the financial completeness score for the user indicates a degree to which a plurality of transaction segments are represented in the financial transactions of the user;

generating a knowledge graph from the financial transactions of the plurality of users;

clustering the plurality of users into a plurality of cohorts, using the knowledge graph;

for each cohort of the plurality of cohorts, creating a corresponding user profile based on the financial-related data for a subset of the plurality of users that are in the cohort;

for each cohort of the plurality of cohorts, selecting a representative user from the subset of the plurality of users that are in the cohort by:

generating an explanation model for the cohort using granular transaction categorization, using the explanation model to cluster the subset of the plurality of users that are in the cohort into a plurality of explainable user clusters, determining a second subset of users that are included in both the subset of the plurality of users and one of the explainable user clusters, selecting, as the representative user for the cohort, a user from the second subset of users, based on the financial completeness score for the user;

providing financial product recommendations to the plurality of users, including for each cohort of the plurality of cohorts:

determining a financial product that is used by the representative user for the cohort and that matches the user profile created for the cohort, sending a recommendation for the financial product to devices of the users included in the subset of the plurality of users that are in the cohort, wherein the recommendation includes an explanation for the recommendation of the financial product, and wherein the explanation is determined using the one of the explainable user clusters in which the representative user is included.

13. A system, comprising:

a non-transitory memory storing instructions; and one or more processors in communication with the non-transitory memory that execute the instructions to:

gather financial-related data for a plurality of users from a plurality of sources, the financial-related data including financial transactions of the plurality of users;

calculate a financial completeness score for each user of the plurality of users, based on the financial-related data corresponding to the user, wherein the financial completeness score for the user indicates a degree to which a plurality of transaction segments are represented in the financial transactions of the user;

generate a knowledge graph from the financial transactions of the plurality of users;

cluster the plurality of users into a plurality of cohorts, using the knowledge graph;

for each cohort of the plurality of cohorts, create a corresponding user profile based on the financial-related data for a subset of the plurality of users that are in the cohort;

for each cohort of the plurality of cohorts, select a representative user from the subset of the plurality of users that are in the cohort by:

generating an explanation model for the cohort using granular transaction categorization, using the explanation model to cluster the subset of the plurality of users that are in the cohort into a plurality of explainable user clusters, determining a second subset of users that are included in both the subset of the plurality of users and one of the explainable user clusters, selecting, as the representative user for the cohort, a user from the second subset of users, based on the financial completeness score for the user;

provide financial product recommendations to the plurality of users, including for each cohort of the plurality of cohorts:

determining a financial product that is used by the representative user for the cohort and that matches the user profile created for the cohort, sending a recommendation for the financial product to devices of the users included in the subset of the plurality of users that are in the cohort, wherein the recommendation includes an explanation for the recommendation of the financial product, and wherein the explanation is determined using the one of the explainable user clusters in which the representative user is included.

\* \* \* \* \*